No. 722,112. PATENTED MAR. 3, 1903.
J. KOELNER.
DOUGH MIXER.
APPLICATION FILED APR. 9, 1902.
NO MODEL.

Witnesses.
C. N. Keney.
Anna V. Faust.

Inventor.
John Koelner
By Benedict & Morsell
Attorneys.

UNITED STATES PATENT OFFICE.

JOHN KOELNER, OF LOUISVILLE, KENTUCKY.

DOUGH-MIXER.

SPECIFICATION forming part of Letters Patent No. 722,112, dated March 3, 1903.

Application filed April 9, 1902. Serial No. 102,013. (No model.)

*To all whom it may concern:*

Be it known that I, JOHN KOELNER, residing at Louisville, in the county of Jefferson and State of Kentucky, have invented a new and useful Improvement in Dough-Mixers, of which the following is a description, reference being had to the accompanying drawings, which are a part of this specification.

My invention relates to improvements in dough-mixers, whereby a construction is provided that is peculiarly well adapted for mixing dough successfully by movements that involve kneading and pressing the dough, and is so constructed that the parts can be readily removed, cleaned, and replaced properly in the mixer, and also includes other features incidental to such construction and disposition of parts.

The invention consists of the dough-mixer, its parts and combinations of parts, as herein described and claimed, or the equivalents thereof.

Figure 1:
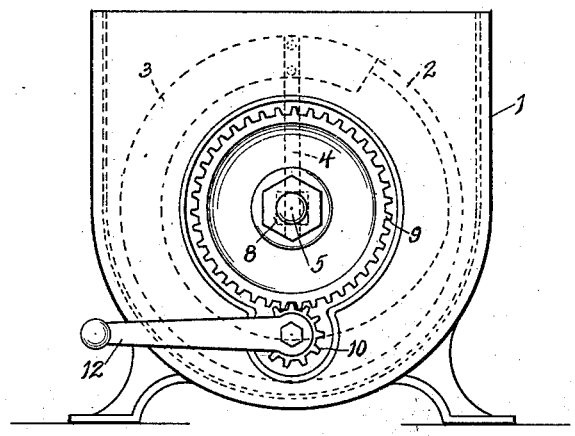
Figure 2:
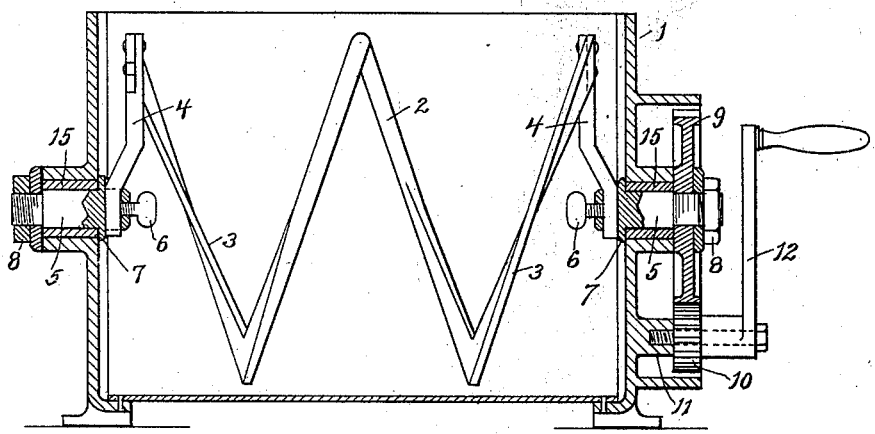
Figures 3, 4:
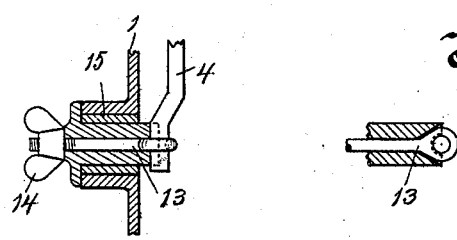

In the drawings, Figure 1 is an end view of my improved dough-mixer. Fig. 2 is a longitudinal central vertical section of my improved mixer. Figs. 3 and 4 illustrate a modified form of means for mounting the mixing device.

The receptacle for holding the dough during the process of mixing may be cylindrical; but I prefer to use a trough-like receptacle having vertical ends and sides with a semicylindrical bottom, and have shown a receptacle of this preferred form in the drawings.

In the drawings, 1 represents the trough or receptacle in which the dough is placed for being mixed and in which the mixer and operating mechanism are mounted. This trough may be of any suitable material and in such size as is desired; but the bottom of the chamber of the trough is to be in semicylindrical form, being thereby adapted, in connection with the vertical ends of the trough, for the proper manipulation of the dough by rotating the mixer therein.

The mixer proper consists of a spiral device, of steel or other suitable material, having advisably about two full circles, the medial portion 2 of which for about one-half a full circle of the device is round, or approximately so, in cross-section, and the adjacent terminal portions of which spiral device are in blade-like form 3, being flattened radially. This spiral device is provided with inwardly-extending radial arms 4 4, which at their outer ends are secured to the blade-like portions of the spiral device at a little distance from their ends, the arms extending inwardly therefrom to the axis of the spiral. For mounting this spiral device rotatively in the receptacle I employ cylindrical hubs 5 5, mounted revolubly in the ends of the receptacle and provided with transverse apertures near their inner ends, into which the ends of the arms 4 4 are inserted and are secured releasably by thumb-screws 6 6. I preferably provide collars 7 7 on the hubs that bear against the inner ends of the receptacle. The radial arms 4 4 are bent and thereby offset inwardly from their terminal portions adapted to enter the hubs 5 5, so that the outer portions of the arms 4 are at a distance from the inner surfaces of the ends of the receptacle, preferably approximately two inches therefrom. The outer extremities of the blade-like portions 3 3 of the spiral or mixer extend past these arms 4 4 and continuing advisably in the direction of the spiral approach somewhat nearer to the ends of the receptacle than the arms are, thus providing means in connection with the arms for pressing or kneading the dough against the ends of the receptacle. On the outer ends of the hubs, and preferably on reduced portions thereof, nuts 8 8 are employed to hold the hubs in place revolubly and releasably in the ends of the receptacle.

One of the hubs 5 is provided with a spur-toothed cog-wheel 9, which meshes with a pinion 10 on an arbor 11, fixed on the end of the receptacle. The pinion 10 is provided with a crank-handle 12, whereby the mixing device is rotated in the receptacle.

It will be understood that when used dough is placed in the receptacle, and by the rotation of the spiral mixer the dough will be turned over and kneaded primarily by the medial round smooth portion 2 and by it and the blade-like parts 3 will be moved toward the end of the receptacle and will be pressed and kneaded against the end of the receptacle until the mass there falls back into the central portion of the receptacle, when the process will be again repeated until the dough shall have been thoroughly and sufficiently mixed. When the dough has been removed from the receptacle, the spiral device can be removed therefrom by loosening the thumbscrews 6, and the parts can then be readily and completely cleaned.

In Figs. 3 and 4 I show a modified form of hub in which the hub instead of being provided with a transverse aperture for the reception of the end of the radial arm 4 is provided with a transverse groove therein for the arm and is provided with a longitudinal aperture through which an eyebolt 13 is inserted, the arm 4 passing through the eye of the bolt, the arm being also provided with a notch in its inner surface into which the eyebolt enters, preventing the withdrawal of the arm from the eyebolt when the eyebolt is drawn to its seat in the hub. A thumb-nut 14 on the eyebolt is adapted to draw the bolt to and secure it in its seat in the hub releasably. With both forms of hub I have shown a sleeve or washer 15, which may be of Babbitt metal. This sleeve is not a necessary part of the construction, but is desirable to get a proper fit of the hub in the boxes provided therefor in the ends of the receptacle.

What I claim as my invention is—

1. In a dough-mixer, a receptacle, a mixing device having a spirally-formed medial portion and radial arms projecting from the ends of the spiral inwardly toward and to the longitudinal axis of the spiral on the same side of the axis and in the same longitudinal radial plane, and means in the hubs for receiving the arms therein transversely coincidently from the same side of the axis and securing the spiral therein releasably.

2. In a dough-mixer, a mixing device consisting of a principal annular spiral member, and terminal radial arms, the spiral member having a central portion round in cross-section and flattened blade-like portions at the ends of the central portion.

3. In a dough-mixer, a receptacle, an annular spiral mixing device mounted rotatably in the receptacle, the spiral device comprising a central plain substantially round rod portion, and radially-flattened blade-like adjoining portions.

4. In a dough-mixer, a receptacle, hubs mounted rotatably in the ends of the receptacle, the hubs being provided with transverse arm-receiving apertures and with set-screws, and a mixing device fitting revolubly in the receptacle and having radial arms adapted to enter in the same direction the transverse apertures in the hubs and to be held releasably to the hubs by the set-screws.

5. In a dough-mixer, a receptacle having vertical ends, rotatable hubs mounted in the ends of the receptacle, a spiral mixing device, and radial arms in a common longitudinal radial plane secured to the spiral device and adapted concurrently to enter radially and be secured releasably to seats therefor in the hubs.

6. In a dough-mixer, a receptacle and a spiral mixing device having a plurality of complete annular twists mounted rotatably in the receptacle, the spiral device having a round rod central part, adjacent blade-like portions the blades being flattened radially, and radial arms supporting the spiral device and located severally at a little distance from the adjacent end of the receptacle, whereby by the rotation of the spiral device in one direction dough in the receptacle will be kneaded by the central portion of the spiral device and carried by a blade against the end of the receptacle and will there be kneaded by the contact of the radial arm therewith and will then fall or be forced back into the central part of the chamber causing the operation on the dough to be repeated.

In testimony whereof I affix my signature in presence of two witnesses.

JOHN KOELNER.

Witnesses:
J. C. DODD,
CHARLES JOHANBOEKE.